Aug. 27, 1957  T. STIGUM  2,804,312
LOG BUNK WITH RELEASABLE STAKES
Filed May 21, 1956  2 Sheets-Sheet 2

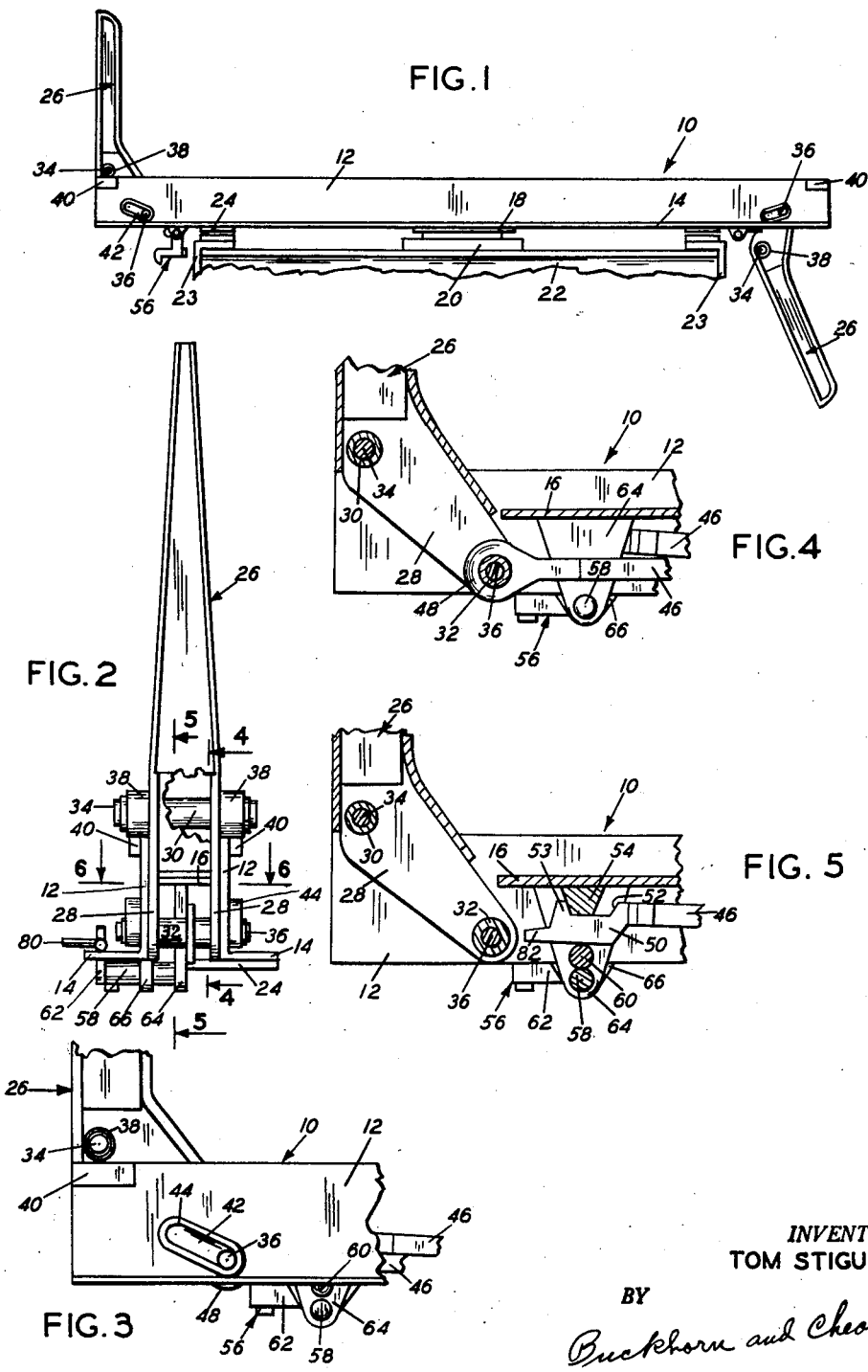

INVENTOR.
TOM STIGUM
BY
Buckhorn and Cheatham
ATTORNEYS

United States Patent Office 2,804,312
Patented Aug. 27, 1957

2,804,312

LOG BUNK WITH RELEASABLE STAKES

Tom Stigum, Portland, Oreg.

Application May 21, 1956, Serial No. 586,085

3 Claims. (Cl. 280—143)

This invention relates to a log bunk and more particularly to a bunk structure having an improved releasable stake supporting and holding mechanism which securely holds the upper portion of the stake in an upright log holding position while minimizing stresses on the stake supporting and holding mechanism and also providing for releasing the stake to enable it to pivot outwardly and downwardly around the end of the log bunk to a log releasing position.

Log bunks having stakes of the type which can be pivoted outwardly and downwardly to a log releasing position have, in general, not been able to withstand the heavy stresses and rough usage to which they have been subjected in logging operations. That is to say, the pivot structure and locking mechanism for holding the upper portion of the stake in upright position has usually failed after a relatively short period of use, one difficulty being the necessity of transmitting heavy stresses from the stake to the bunk through a relatively short lever arm because of space limitations.

In accordance with the present invention, supporting elements movable longitudinally of the bunk are employed and the stake is secured in log holding position by structure providing a relatively long lever arm including elements engaging the bunk at two relatively widely spaced positions. Movement of the stake longitudinally of the bunk is required to move the stake to log releasing position and locking mechanism is provided to prevent such movement and retain the stake in log holding position. In such position, rigid portions of the bunk and of the stake transmit the stresses due to the load of logs on the bunk from the stake to the bunk. Upon the release of the locking mechanism, the stake can move longitudinally of the bunk toward the adjacent end thereof until supporting elements of the stake resting upon the top of spaced longitudinally extending side members of the bunk clear the the end of the bunk.

The stake has a portion which extends downwardly and toward the center of the bunk between the side members of the bunk when the stake is in log holding position. The end of such portion of the stake is spaced from the end of the bunk and a guide on the bunk enables such end to move in a direction generally longitudinally of the bunk but prevents such end from moving upwardly when the stake is in its log holding position. The guide pivotally connects such end to the bunk and when the supporting elements, referred to above, clear the end of the bunk, the stake can pivot outwardly and downwardly to log release position. In the preferred construction, the end of the portion of the stake which extends between the side members of the bunk is guided along a path which is inclined upwardly toward the end of the bunk so that the stake has limited tilting motion outwardly of the bunk during its movement longitudinally of the bunk to log releasing position. Such movement is thereby facilitated by a camming action provided by the inclination of such path. Also, the supporting elements of the bunk which rest upon the upper portions of the side members of the bunk are preferably rollers to facilitate movement of the stake longitudinally of the bunk.

The bunk also includes a holding structure for preventing longitudinal movement of the stake relative to the bunk toward the adjacent end of the bunk when the stake is in log holding position. Such structure includes a tension member extending to the other end of the bunk and mechanism for locking the tension members to the bunk at such other end. The preferred mechanism includes a notched end on the tension member and a stationary lug on the bunk, which is releasably received within the notched end, in combination with a cam member for releasably holding the notched end in engagement with the lug. Such holding structure secures the stake against the longitudinal movement, discussed above, but the structure is such that the tension member is readily released to allow the stake to move longitudinally of the bunk and then pivot to log releasing position.

It is therefore an object of the present invention to provide an improved log bunk in which a stake is securely held in log holding position but is easily releasable to enable the stake to move outwardly and downwardly to log releasing position.

Another object of the invention is to provide a log bunk in which a stake is securely held in log holding position by rigid portions of the stake and log bunk spaced a substantial distance longitudinally of the log bunk and in which the stake can be moved longitudinally of the log bunk and then pivoted outwardly and downwardly to a log releasing position when a locking mechanism preventing such longitudinal movement of the stake is released.

A further object of the invention is to provide an improved log bunk in which a stake at the end of the bunk is held in log holding position by a portion thereof resting upon the ends of spaced side members of the bunk and another portion extending downwardly and toward the center of the bunk and between the side members and secured against upward movement relative to the bunk and in which the stake is movable to log releasing position by combined movement longitudinally of the bunk toward the adjacent end of the bunk and the pivotal movement outwardly and downwardly around such end of the bunk.

Other objects and advantages of the invention will appear in the following description of preferred embodiments shown in the attached drawing of which:

Fig. 1 is a side elevation of the log bunk of the present invention showing a stake at one end of the bunk in log holding position and a stake at the other end of the bunk in log releasing position;

Fig. 2 is an end elevation of the stake in Fig. 1 on a larger scale with parts broken away to show certain of the interior structure and with the pivot structure at the center of the bunk omitted;

Fig. 3 is a partial side elevation of the bunk of Fig. 1 on an enlarged scale;

Fig. 4 is a partial vertical section of an end of the log bunk taken on the line 4—4 of Fig. 2;

Fig. 5 is a view similar to Fig. 4 taken on the line 5—5 of Fig. 2;

Figure 6:
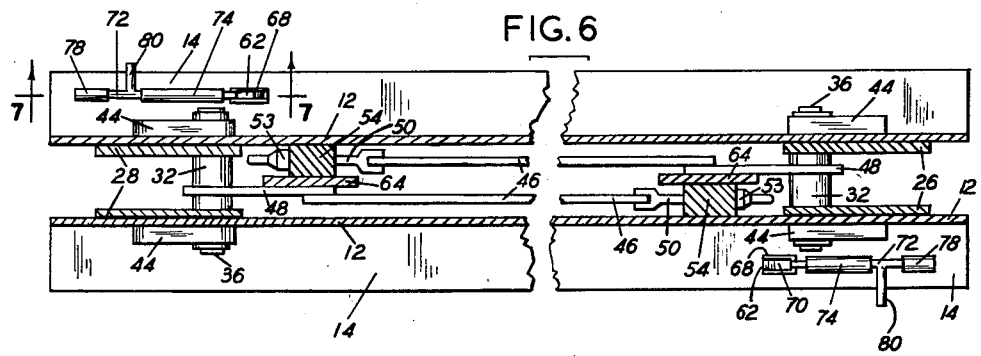
Fig. 6 is a horizontal section taken on the line 6—6 of Fig. 2 with the central portion of the log bunk omitted.

Referring more particularly to Figs. 1 and 2 of the drawings, the log bunk 10 includes a pair of spaced side members 12 having flanges 14 at their lower edges extending laterally therefrom. The side members are secured to an intermediate horizontal plate member 16 of less length than the side members 12. The side members 12 are also secured intermediate their ends to a central bearing member 18 resting upon a bearing member 20 secured to the frame of a truck or trailer, such frame including a crosspiece 22 and side rails 23. The side members 12 of the bunk are also secured at positions spaced from the bearing member 18 to wear plates 24, all of the elements of the bunk thus far described being secured together by welding.

A stake 26 is mounted at each end of the log bunk 10, the stake at the left end of the bunk in Fig. 1 being shown in its upright or log supporting position, and the stake at the right end of the beam in such figure being shown in its log releasing position. The log holding end of each stake 26 is of hollow, rectangular tubular form made up of metal plates welded together and, as shown in Fig. 2, such portion of the stake preferably tapers with respect to its dimension laterally of the log bunk 10 so as to be narrower at its free end. The other end of the stake 26 includes a pair of laterally spaced plates 28 secured to the log holding portion of the stake and also secured together by spaced tubular members 30 and 32 which receive laterally extending pins 34 and 36, respectively. The tubular member 30 is positioned intermediate the ends of the stake and the pin 34 received therein has a roller 38 journaled on each of its ends. When the stake is in log holding position, the plates 28 extend downwardly between the side members 12 of the bunk and the rollers 38 rest upon the upper surfaces of the side members 12 adjacent the ends of the bunk, such side members having reinforcing blocks 40 secured thereto to provide greater areas of contact with the rollers 38 than that afforded by the upper edges of the side members. As shown in Figs. 4 and 5, the stake is of bell crank form as the plates 28 also extend inwardly toward the center of the log bunk 10 from the pin 34, the pin 36 being positioned adjacent the free ends of the plates. The pin 36 extends laterally from the plates 28 and is received in slots 42 in the side members 12 of the log bunk, the slots 42 being inclined upwardly toward the ends of the bunk end and being surrounded by reinforcing portions 44 secured to side members 12. The slots 42 form guides for the pins 36 during movement of the stake longitudinally of the bunk.

When the stake 26 is in the log holding position shown at the left end of Fig. 1, forces due to logs on the bunk 10 tend to pivot the stake 26 outwardly and downwardly and such forces are resisted by the rollers 38 bearing upon the blocks 40 and by the pins 36 bearing upon the upper portions of the slots 42 and the reinforcing members 44. Upon movement of such stake 26 to the left in Fig. 3, the pin 36 moves laterally in the slots 42 toward the end of the bunk 10 until the rollers 38 clear the end of the bunk after which the stake can pivot outwardly and downwardly around the pin 36 to log releasing position.

Figure 7:
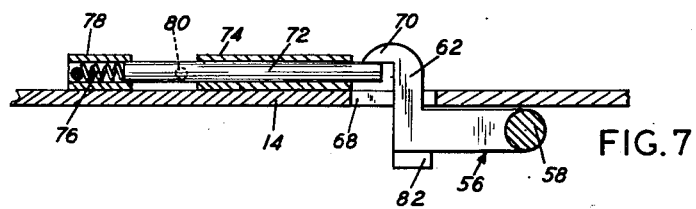
Fig. 7 is a fragmentary vertical section on an enlarged scale taken on the line 7—7 of Fig. 6.
Figures 8, 10:
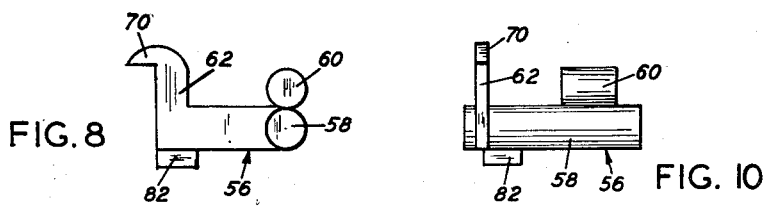
Fig. 8 is a side elevation on the same scale as Fig. 7 of the cam member forming part of the locking mechanism for the log stake of the present invention.
Fig. 10 is an end elevation of the cam member of Fig. 8.
Figure 9:
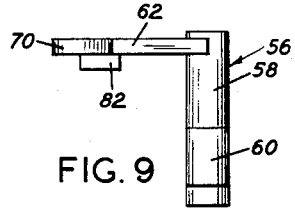
Fig. 9 is a plan view of the cam member of Fig. 8.

The stake 26 can be held against movement longitudinally of the bunk 10 toward the adjacent end of the bunk by a tension member 46 having an eye 48 surrounding the tubular member 32 which receives the pin 36. The other end of the tension member 46 extends to the other end of the bunk 10, as shown in Fig. 6, and terminates in a notched portion 50 which can be locked to the bunk. As shown in Fig. 6, there are two tension members 46, one for each end of the bunk, both tension members being identical. The form of the notched portion 50 is best shown in Fig. 5 and such portion contains a notch 52. The notch 52 provides an abutment 53 on the tension member which engages an abutment on the bunk provided by a lug 54 when the tension member is in the locked position shown in Fig. 5. Such notched end 50 is held in locked position by a cam member 56 having the form shown most clearly in Figs. 8 to 10, inclusive. The cam member 56 has a shaft portion 58 to which is welded adjacent one end a cam portion 60 and to which is also welded adjacent the other end, a hooked member 62. The shaft portion 58 is journaled in a bearing member 64 (Fig. 4) which depends from the horizontal plate member 16 forming part of the bunk and also in a bearing member 66 (Fig. 2) secured to the lower portion of a side member 12 of the bunk. The hooked member 62 has an end extending upwardly through a slot 68 (Figs. 6 and 7) in the flange 14 of a side member 12 and terminates in a hooked portion 70 engaging over the end of a spring latch 72 when the cam member is in locking position. The latch 72 is mounted for sliding movement in a guide 74 secured to flange 14 and is urged to the right in Fig. 7 by means of a compression spring 76 positioned in another guide member 78 secured to the flange 14.

As shown in Fig. 5, the cam portion 60 of the cam member 56 engages under the notched end 50 of the tension member 46 when in locking position to hold such notched end in engagement with the lug 54. This prevents longitudinal movement of the stake at the other end of the bunk toward such other end, since the eye 48 at the other end of the tension member 46 surrounds the tubular member 32 forming part of the stake 26 at such other end of the bunk. The latch 72 is provided with a handle 80 and upon manual movement of the latch 72 to the left in Fig. 6 by such handle against the action of the spring 76, the end of the latch is removed from beneath the hooked portion 70 of the cam member 56 so that the cam member may pivot counterclockwise in Fig. 7. A laterally projecting block 82 is welded to the hooked member 62 of the cam member 56 so that a suitable tool, or the hands of the operator, may be employed to pivot the cam member 56 in such counterclockwise direction to remove the cam portion 60 from engagement with the notched end 50 of the tension member 46. This allows the end 50 of the tension member 46 to drop downwardly and allows the stake 26 at the other end of the bunk to be moved longitudinally of the bunk until the rollers 38 of the stake clear the end of the bunk after which the stake may be pivoted downwardly to position shown at the right end of the bunk in Fig. 1.

It will be apparent that the load of logs on the bunk 10, or forces due to conventional log unloading machinery, will tend to pivot the stake outwardly and downwardly and also tend to move the stake horizontally along the bunk toward the adjacent end of the bunk when the locking mechanism, just described, is released. It has been found desirable to incline the slot 42 upwardly, as shown in Fig. 3, to provide a camming action tending to move the stake longitudinally of the bunk as the stake partially pivots around the rollers 38 during longitudinal movement of the stake along the bunk. A horizontal slot or a slot of too low an angularity with respect to the horizontal many times causes the stake to jam so that it is difficult to move the stake from log holding to log releasing position. Too great an inclination of the slot, on the other hand, causes the stresses on the locking mechanism for the stake to be excessive. It has been found that an angle to the horizontal of the order of 20 degrees, i. e., from 15 to 25 degrees, is in most cases satisfactory. When the stake has been moved to log releasing position, any logs on the bunk may be easily removed by conventional log unloading machinery, such as a winch and cable.

After the logs have been removed from the bunk 10, the stake 26 may be manually returned to log holding position. The stake is first pivoted upwardly and then inwardly toward the center of the bunk, the rollers 38 rolling up the end of the bunk and then inwardly along the bunk so as to come to rest upon the support blocks 40. During the latter movement, the stake moves inwardly along the bunk 10 and the notch 52 in the member 50 of the tension member 46 is again positioned below the lug 54. The notched portion 50 has an extending end 82 which rests on the shaft portion 58 of the cam member 56 when the cam member is in unlocking position and when the tension member 46 is moved to the right in Fig. 5 to release a stake connected thereto. This prevents the tension member 46 from dropping out of the bunk 10. Upon return of the tension member 46 to the left in Fig. 5 until the notch 52 has its end 50 below the lug 54, the cam member 56 can be rotated into the position shown in Fig. 5 so as to raise the notched end 50 of the tension member upwardly and cause the notch 52 to engage the lug 54. This causes the hooked end 70 (Fig. 7) of the cam member 56 to cam the spring-pressed latch 72 out of the path of such end after which the spring 76 causes the latch 72 to engage under the hooked end 70. The stake 26 is then again locked in upright position.

In operation, the stakes 26 at each end of the log bunk are placed in their upright position prior to loading logs on the bunk 10. That is to say, both stakes 26 are locked against movement longitudinally of the bunk 10 toward the adjacent ends of the bunk by the tension members 46 which extend between the tubular members 32 of the stakes 26 and the lugs 54 at the opposite ends of the bunk. The notched end 50 of each tension member 46 engages a lug 54 and is held in engagement with such lug by a cam member 56 occupying the position shown in Figs. 5 and 7. In this position each cam member 56 is held in its locking position by a spring latch 72 engaging under the hooked end 70 of such cam member. Logs are loaded upon the bunk, which may form part of a logging truck or trailer, and transported while held in position by the stakes 26. Upon reaching a discharge point, the stake at one end of the bunk is released by manually moving the latch member 72 at the other end of the bunk by its handle 80 against the force of the spring 76 to release the associated cam member 56. The cam member 56 then either pivots by gravity about its shaft element or may be manually pivoted so that the notched end 50 of the tension member 46 can move downwardly to clear the lug 54. The stake 26 thus released can then move longitudinally of the bunk so that the rollers 30 projecting laterally from the stake clear the end of the bunk. The stake can then pivot downwardly to the position shown at the right end of Fig. 1. The weight of the logs on the stake or movement of the logs toward the end of the bunk, for example by a conventional winch and cable, causes such movement of the stake. The upward inclination of the slot 42 provides a camming action assisting in causing the stake to move toward the end of the bunk.

After the logs have been removed from the bunk 10, the stake can be manually moved to its log holding position by pivoting the stake around the pin 36 and positioning the rollers 38 on the top of the side members 12 of the bunk and in engagement with the blocks 40. This brings the notched end 50 of the tension member 46 connected to such stake into position for the notch 52 to engage the lug 54 and the cam member 56 may then be manually returned to its locking position to raise the notched end 50 of the tension member 46. The hooked end 70 of the cam member 56 cams the spring-pressed latch 72 out of its path and then again engages the top of such spring-pressed latch. In the locked position of the stake, the forces on the stake by logs positioned upon the bunk are transmitted to the bunk at relatively widely spaced points through the rollers 38 and through the pin 36, thus providing a lever arm of substantial length, so that stresses on the stake and bunk are minimized.

Figure 11:
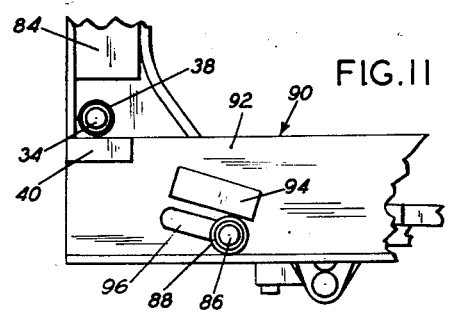
Fig. 11 is a view similar to Fig. 3 showing a modified type of log bunk.

A modified construction is shown in Fig. 11 in which a stake 84 is employed which may be the same as the stake 26 of Figs. 1 to 10, except that a pin 86 having rollers 88 on its end is substituted for the pin 36 of Figs. 1 to 10. Also, the bunk 90 of Fig. 11 may be the same as the bunk 10 of Figs. 1 to 10, except that the side members 92, corresponding to the side members 12 of Figs. 1 to 10, are provided with inclined guide blocks 94 welded thereto so as to be parallel with slots 96 in the side members 92, the slots receiving the pins 86 and being inclined upwardly toward the end of the bunk 90. When the stake 84 is moved from its log holding position shown in Fig. 11 to a log releasing position, the rollers 88 roll along the blocks 94 at the same time the rollers 38 roll along the blocks 40. When the stake is in log holding position, any stress on the stake 84 is transmitted to the bunk 90 through the spaced rollers 38 and 88 bearing against the reinforcing blocks 40 and 94, respectively. Since the rollers 88 reduce friction during the movement of the stake 84 longitudinally of the bunk, the slots 96 and guide blocks 94 may have a somewhat less inclination than the slots 42 of Figs. 1 to 10. Otherwise, the structure shown in Fig. 11 may be the same as the structure shown in Figs. 1 to 10 and may operate in the same manner.

While I have disclosed the preferred embodiments of my invention, it is to be understood that the details thereof may be varied and that the invention is to be limited only by the scope of the following claims.

I claim:

1. A log bunk comprising a pair of side members extending longitudinally of said bunk and being spaced from each other at an end of said bunk, a stake mounted on said end of said bunk and having a log holding position and a log releasing position, said stake including a log holding portion extending upwardly from said bunk and supporting elements resting upon said side members adjacent said end of said bunk when said stake is in said log holding position, said stake also including another portion extending between said side members, means spaced from said end of said bunk for holding said other portion against upward movement relative to said bunk when said stake is in said log holding position, said means including guide means for said other portion providing for movement of said stake longitudinally of said bunk in a direction toward said end to enable said supporting elements to clear said end of said bunk and including pivot means for pivoting said stake outwardly and downwardly to said log releasing position when said supporting elements clear said end of said bunk, and releasable means for locking said stake against said movement longitudinally of said bunk, said releasable means including a tension member connected to said other portion of said stake and extending to a position adjacent the other end of said bunk, and means at said position for releasably locking said tension member against longitudinal movement relative to said bunk including an abutment on said tension member and an abutment on said bunk and pivoted cam means for retaining said abutments in engagement when said stake is in log holding position.

2. A log bunk comprising a pair of spaced side members extending longitudinally of said bunk and secured together intermediate their ends, a stake mounted on an end of said bunk and having a log holding position and a log releasing position, said stake when in log holding position including a log holding portion extending upwardly from said end of said bunk and another portion extending downwardly between said side members and toward the center of said bunk, rollers mounted on each side of said stake adjacent the junction of said portions, said rollers resting on the tops of said side members adjacent said end of said bunk, said side members having slots spaced from said end of said bunk, said slots extending longitudinally of said bunk and being inclined upwardly toward said end of said bunk, said other portion of said stake having a pivot element extending laterally from its end and received in said slots to hold said with said other portion against upward movement when said stake is in log holding position, said slots providing for movement of said stake longitudinally of said bunk in a direction toward said end of said bunk to enable said rollers clear the end of said bunk and said stake to pivot outwardly and downwardly about said pin to log releasing position, means for releasably holding said stake against said movement longitudinally of said bunk including a tension member connected to said other portion of said stake and extending btween said side members to a position adjacent the other end of said bunk, and means adjacent said other end of said bunk for releasable locking said tension member to said bunk.

3. A log bunk comprising a pair of spaced side members extending longitudinally of said bunk and secured together intermediate their ends, a stake mounted on an end of said bunk and having a log holding position and a log releasing position, said stake when in log holding position including a log holding portion extending upwardly from one end of said bunk and another portion extending downwardly between said side members and toward the center of said bunk, rollers journaled on each side of said stake adjacent the junction of said portions, said rollers resting on the tops of said side members adjacent said end of said bunk, said side members having slots spaced from said end of said bunk, said slots extending longitudinally of said bunk and being inclined upwardly toward said end of said bunk, said other portion of said stake having a pivot element extending laterally from its end and received in said slots to hold said with said other portion against upward movement when said stake is in log holding position, said slots providing for movement of said stake longitudinally of said bunk in a direction toward said end of said bunk to enable said rollers clear the end of said bunk and said stake to pivot outwardly and downwardly to log releasing position, means for releasably holding said stake against said movement longitudinally of said bunk including a tension member connected to said other portion of said stake and extending between said side members to a position adjacent the other end of said bunk, and means adjacent said other end of said bunk for releasable locking said tension member to said bunk including an abutment on said tension member and on said bunks, a pivoted cam member engaging said tension member when in locking position to hold said abutments in engagement and a spring-pressed latch for retaining said cam member in said locking position.

References Cited in the file of this patent

UNITED STATES PATENTS 2,131,337     Swertfeger  ---------- Sept. 27, 1938